United States Patent
Thomas et al.

(10) Patent No.: US 8,503,060 B2
(45) Date of Patent: Aug. 6, 2013

(54) VEHICULAR BLIND SPOT MIRROR ASSEMBLY

(75) Inventors: Timothy J. Thomas, Zeeland, MI (US); David J. Cammenga, Zeeland, MI (US); Mark A. Snyder, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 797 days.

(21) Appl. No.: 12/192,395

(22) Filed: Aug. 15, 2008

(65) Prior Publication Data

US 2010/0039691 A1    Feb. 18, 2010

(51) Int. Cl.
  *G02F 1/15* (2006.01)
  *G02F 1/153* (2006.01)

(52) U.S. Cl.
  USPC .......................................... 359/267; 359/265

(58) Field of Classification Search
  USPC ............... 359/265, 841, 843, 850, 864, 865, 359/868, 871, 872, 877, 267, 842
  See application file for complete search history.

(56) References Cited

U.S. PATENT DOCUMENTS

| | | | |
|---|---|---|---|
| 4,834,521 A * | 5/1989 | Dubs ........................ | 359/850 |
| 5,151,824 A | 9/1992 | O'Farrell | |
| 5,448,397 A | 9/1995 | Tonar | |
| 5,479,297 A * | 12/1995 | Summers ................. | 359/841 |
| 5,803,579 A | 9/1998 | Turnbull et al. | |
| 5,923,457 A | 7/1999 | Byker et al. | |
| 6,102,546 A | 8/2000 | Carter | |
| 6,132,072 A | 10/2000 | Turnbull et al. | |
| 6,170,956 B1 | 1/2001 | Rumsey et al. | |
| 6,195,194 B1 | 2/2001 | Roberts et al. | |
| 6,229,435 B1 | 5/2001 | Knapp et al. | |
| 6,239,898 B1 | 5/2001 | Byker et al. | |
| 6,244,716 B1 | 6/2001 | Steenwyk et al. | |
| 6,335,548 B1 | 1/2002 | Roberts et al. | |
| 6,356,376 B1 | 3/2002 | Tonar et al. | |
| 6,359,274 B1 | 3/2002 | Nixon et al. | |
| 6,379,013 B1 | 4/2002 | Bechtel et al. | |
| 6,402,328 B1 | 6/2002 | Bechtel et al. | |
| 6,426,485 B1 | 7/2002 | Bulgajewski et al. | |
| 6,441,943 B1 | 8/2002 | Roberts et al. | |
| 6,471,362 B1 | 10/2002 | Carter et al. | |
| 6,504,142 B2 | 1/2003 | Nixon et al. | |
| 6,521,916 B2 | 2/2003 | Roberts et al. | |
| 6,523,976 B1 | 2/2003 | Turnbull et al. | |
| 7,126,456 B2 | 10/2006 | Boddy et al. | |
| 7,306,355 B2 | 12/2007 | Walser et al. | |
| 7,324,261 B2 | 1/2008 | Tonar et al. | |
| 7,342,707 B2 | 3/2008 | Roberts et al. | |
| 7,349,143 B2 | 3/2008 | Tonar et al. | |
| 2002/0072026 A1 * | 6/2002 | Lynam et al. ............ | 432/77 |
| 2006/0056086 A1 * | 3/2006 | Hannah .................... | 359/843 |

* cited by examiner

*Primary Examiner* — Mahidere Sahle
(74) *Attorney, Agent, or Firm* — Price Heneveld LLP; Scott P. Ryan (57) ABSTRACT

A vehicular mirror assembly (100) includes a first bezel (107) for housing an electrochromic (EC) glass element and a second bezel (109) for housing a spotter glass (111) element. A spotter glass heating element (113) is positioned behind the spotter glass element (111) for heating the spotter glass (111) above an ambient temperature.

71 Claims, 8 Drawing Sheets

VEHICULAR BLIND SPOT MIRROR ASSEMBLY

FIELD OF THE INVENTION

The present invention is related to a mirror and more particularly to an external vehicular blind spot mirror assembly that includes both a primary and spotter mirror element.

BACKGROUND

Vehicular or automotive mirrors have a field of view (FOV) that is the total viewing angle of the mirror. The FOV depends on the position of the viewer, the position of the mirror, the angle of the mirror, the radius of curvature of the mirror and the size of the mirror. In the United States planar mirrors are required on the driver's side of the vehicle, while convex mirrors (spherically curved) are allowed on the side opposite the driver. In Europe it is common to use what is known as aspheric mirrors. These mirrors typically have a spherical curvature for most of the mirror and then transition to a changing and tighter radius in the outboard portion of the mirror. The aspheric design has been used for many years in Europe to eliminate or reduce the driver's blind spot. The blind spot typically is located between the image viewed at the outermost portion of the side mirror and the driver's peripheral vision. In the United States aspheric mirrors are not allowed as a feature on new vehicles on the driver's side of the vehicle. The requirement in the United States is that a specified FOV must be met using a driver's side mirror with unit magnification. This results in flat driver's side mirrors. In contrast, on the passenger's side of the vehicle, a convex mirror is permitted by law. Still, a blind spot typically exists on the passenger's side of the vehicle.

A mirror known as "spotter mirror" is typically a convex mirror with a radius of curvature less than 500 mm, although a mirror with a larger radius of curvature or even a flat spotter element can be effective if the angle of the mirror is adjusted in such a way to provide additional FOV for the driver. The smaller the radius of curvature of the spotter mirror element, the greater the resulting FOV of that mirror provided all other variables are being held constant. A smaller radius mirror also reduces the size of the viewed image, so it can becomes increasingly difficult to see the image in the mirror. A spotter mirror may also be an aspheric mirror or any mirror that provides an increased FOV when compared with a standard mirror. The spotter mirror can be added to either side of the vehicle.

The alignment of the spotter mirror image with the image viewed in the standard mirror effects the FOV and the resulting blind spot. The blind spot is that area to the side and rear of the vehicle which may not be visible to the driver when using a conventional planar-type vehicle mirror. The image viewed in the spotter mirror element can overlap with that of the standard mirror, or the image could be discontinuous leaving a small blind spot between the two images.

Most spotter mirrors known in the art have an overlap region created by the spotter and standard mirror images. The FOV, the blind spot, and the overlap of the images are all affected by the position of the mirror and the position of the driver. If a driver chooses to angle the mirror away from the side of the vehicle or towards the side of the vehicle, the FOV, the blind spot, and the amount of overlap will change.

Some spotter mirrors are connected to the standard mirrors so when the standard mirror is repositioned, the spotter mirror is repositioned with it. Even in this case, the FOV, the blind spot, and the amount of image overlap will change. In the configuration when the spotter mirror is fixed or moves independently from the standard mirror, the changes will typically be greater.

Prior art spotter-type mirrors can also include those using a faceted or Fresnel spotter mirror where the spotter mirror element is positioned below and/or under the conventional mirror. Some mirrors are the aftermarket type enabling the user to stick-on the spotter mirror element to the surface of a preexisting mirror. Still other spotter mirror elements are arranged such that a portion of the mirror overlaps the conventional mirror or is oriented in a side-by-side relationship. Still others require mirror separation such that the front surfaces of the planar and spotter mirror elements are generally coplanar with one other. These types of mirrors also do not typically include any means to defrost or de-ice the mirror in the event of cold and moist conditions which would obstruct the driver's view and prevent the mirror from operating properly.

Additionally, there are some spotter mirror systems that are used in connection with recognition enhancement devices that operate to enhance a driver's recognition of an object in the blind spot. These systems work using an electronic device that is actuated upon detection of the object in the vehicle's blind zone. These types of mirrors are intended to effectively draw the operator's visual attention to the spotter mirror when vehicles or other objects enter the vehicle blind spot. Similarly, other mirrors and their associated components such as U.S. Pat. Nos. 7,349,143, 7,342,707, 7,324, 261, 7,306,355, 6,441,943, 6,244,716, 6,523,976, 6,521,916, 6,441,943, 6,335,548, 6,132,072, 5,803,579, 6,229,435, 6,504,142, 6,402,328, 6,379,013, 6,359,274 5,151,824, 6,244,716, 6,426,485, 6,441,943, 6,356,376, 5,448,397, 6,102,546, 6,195,194, 5,923,457, 6,238,898, 6,170,956 and 6,471,362 have been disclosed in the art and all of which are incorporated by reference in their entirety.

These and other features, advantages and objects of the present invention will be further understood and appreciated by those skilled in the art by reference to the following specification, claims and appended drawings.

DETAILED DESCRIPTION OF PREFERRED EMBODIMENT

Before describing in detail embodiments that are in accordance with the present invention, it should be observed that the embodiments reside primarily in combinations of method steps and apparatus components related to a complementary cumulative distribution driven level convergence system and method. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
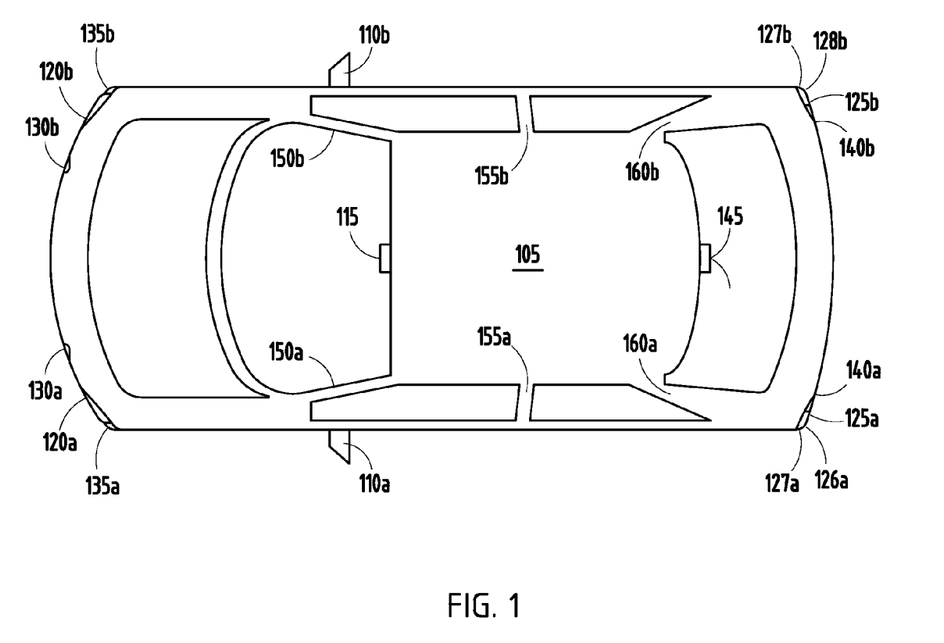
FIG. 1 is a block diagram depicting a controlled vehicle in accordance with various embodiments of the invention.

Referring initially to FIG. 1, there is shown a controlled vehicle 105 having a driver's side outside rearview mirror 110a, a passenger's side outside rearview mirror 110b and an inside rearview mirror 115. Details of these and other features will be described herein. Preferably, the controlled vehicle comprises an inside rearview mirror of unit magnification. Unit magnification mirror, as used herein, means a plane or flat mirror with a reflective surface through which the angular height and width of an image of an object is equal to the angular height and width of the object when viewed directly at the same distance with the exception for flaws that do not exceed normal manufacturing tolerances. A prismatic daynight adjustment rearview mirror wherein at least one associated position provides unit magnification is considered herein to be a unit magnification mirror. Preferably, the mirror provides a field of view with an included horizontal angle measured from the projected eye point of at least 20 degrees and a sufficient vertical angle to provide a view of a level road surface extending to the horizon beginning at a point not greater than 61 m to the rear of the controlled vehicle when the controlled vehicle is occupied by a driver and four passengers or the designated occupant capacity, if less, based on an average occupant weight of 68 kg. It should be understood that the line of sight may be partially obscured by seated occupants or by head restraints. The location of the driver's eye reference points are preferably in accordance with regulation or a nominal location appropriate for any 95th percentile male driver. Preferably, the controlled vehicle comprises at least one outside mirror of unit magnification. The outside mirror provides a driver of a controlled vehicle a view of a level road surface extending to the horizon from a line, perpendicular to a longitudinal plane tangent to the driver's side of the controlled vehicle at the widest point, extending 2.4 m out from the tangent plane 10.7 m behind the driver's eyes, with the seat in the rearmost position. It should be understood that the line of sight may be partially obscured by rear body or fender contours of the controlled vehicle.

The locations of the driver's eye reference points are in accordance with regulation or a nominal location appropriate for any 95th percentile male driver. Preferably, the passenger's side mirror is not obscured by an unwiped portion of a corresponding windshield and is preferably adjustable by tilting in both horizontal and vertical directions from the driver's seated position. In at least one embodiment, the controlled vehicle comprises a convex mirror installed on the passenger's side. Preferably, the mirror is configured for adjustment by tilting in both horizontal and vertical directions. Preferably, each outside mirror comprises not less than 126 cm of reflective surface and is located so as to provide the driver a view to the rear along an associated side of the controlled vehicle. Preferably, the average reflectance of any mirror, as determined in accordance with SAE Recommended Practice J964, OCT84, is at least 35 percent (40 percent for many European Countries). In embodiments where the mirror element is capable of multiple reflectance levels, such as with electro-optic mirror elements in accordance with the present invention, the minimum reflectance level in the day mode shall be at least 35 percent (40 percent when for European use) and the minimum reflectance level in the night mode shall be at least 4 percent.

With further reference to FIG. 1, the controlled vehicle 105 may comprise a variety of exterior lights, such as, headlight assemblies 120a, 120b, foul conditions lights 130a, 130b, front turn signal indicators 135a, 135b, taillight assembly 125a, 125b, rear turn signal indicators 126a, 126b, rear emergency flashers 127a, 127b, backup lights 140a, 140b, and center high mounted stop light (CHMSL) 145. As described in detail herein, the controlled vehicle may comprise at least one control system incorporating various components that provide shared function with other vehicle equipment. An example of one control system described herein integrates various components associated with automatic control of the reflectivity of at least one rearview mirror element and automatic control of at least one exterior light. Such systems may comprise at least one image sensor within a rearview mirror, an A-pillar, a B-pillar, a C-pillar, a CHMSL, or elsewhere within or upon the controlled vehicle. Images acquired, or portions thereof, maybe used for automatic vehicle equipment control. The images, or portions thereof, may alternatively or additionally, be displayed on one or more displays. At least one display may be covertly positioned behind a transflective, or at least partially transmissive, electro-optic element. A common controller may be configured to generate at least one mirror element drive signal and at least one other equipment control signal.

Figure 2:
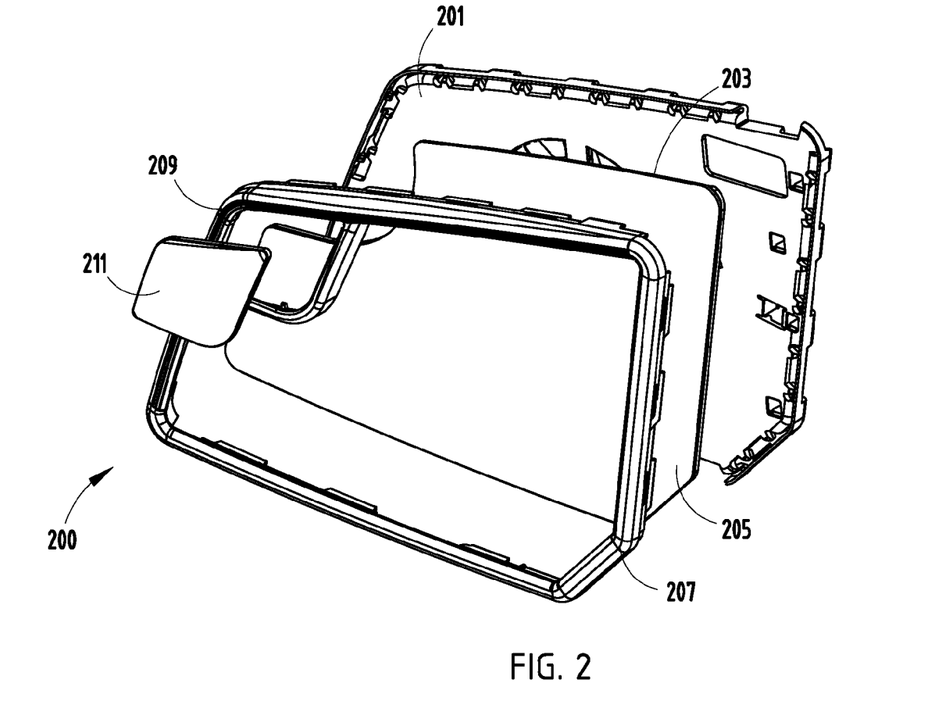
FIG. 2 is an isometric view of a first embodiment of a heated blind spot mirror assembly with a portion of the mirror assembled from the front of the bezel.

FIG. 2 is an isometric view of a first embodiment of the heated blind spot mirror assembly 200 where a portion of the mirror is assembled from the front of the bezel. The heated blind spot mirror assembly 200 includes a glass carrier 201 located at the rear of the assembly which is used to securely hold the primary heater 203 as well as the primary glass 205. Although the preferred embodiment is EC glass, it will be evident to those skilled in the art that standard or non-EC glass may also be used. The heater may be a resistive element that when supplied with a predetermined current, will act to heat the planar glass sheet that forms the EC glass 205. A primary bezel 207 is conformed to the shape of the primary glass 205 and provides a top cover along the primary glass 205 to be inserted about the perimeter of the primary bezel 207. The glass carrier 201 and primary bezel 207 form a compression-type assembly that acts to hold a primary heater 103 and primary glass 205 into a fixed position.

The heated spotter mirror 200 further includes a spotter bezel 209 that is located at an upper corner of the primary bezel 207. It will be recognized by those skilled in the art the primary bezel 207 and the spotter bezel 209 operate as different features within the same part. Although the spotter bezel 209 is shown generally rectangular in shape, it may be formed into any desired configuration or size. The spotter bezel 209 forms an enclosed section for housing a secondary mirror such as spotter glass 211. The spotter glass 211 generally forms the same or similar outlined shape as the spotter bezel 209 enabling it to be form-fit within the spotter bezel 209. The spotter glass 211 may be held in position using mechanical fasteners or adhesive material for holding and/or clasping the spotter glass 211 into a fixed position. The spotter mirror glass 211 provides a second or auxiliary mirror lens for providing a field of view of the driver's blind spot. Thus, the spotter mirror element 211 provides a convenient means by which an image of an object in a vehicle's blind zone may be viewed by the vehicle's driver or operator.

When using a spotter mirror from driver's position, the image of an object viewed in a spotter mirror element on the passenger's side of the vehicle can be much smaller in appearance than the same object viewed in a similar spotter mirror element on the driver's side of the vehicle. This gives the driver an impression that the object is further in distance. For flat or convex mirrors with the same or similar radius of curvature, the relationship on how the object is viewed is directly related to the distance from the mirror to the driver's eye. If all other factors remain constant, an image will appear smaller as an object moves away from the mirror. The relationship between distance from the mirror and the "perceived amount" that the image is reduced in size depends on a number of factors, including the radius of curvature of the mirror and the distance of the observed object from the mirror. The effect is particularly a problem when the viewed object is small or when a larger object is a large distance away from the mirror.

In order to obtain the largest field of view in the smallest mirror area, it is desirable to use a spotter mirror element with a radius of curvature that is smaller than that of the standard mirror. If a radius of curvature is chosen that is too small, the image in the mirror can become difficult to see and the usefulness of the mirror could be diminished. At the extreme, images can no longer be distinguished in the blind spot region. This is especially true for the passenger's side of the vehicle because of the increased distance between the driver and the mirror. Previous mirror systems found in the art use the same or similar radius of curvature spotter mirror elements on both the passenger's side and the driver's side. It is an advantage to use a larger radius of curvature spotter mirror element when the mirror is positioned further from the driver. In this way, the viewed image from the more distant spotter mirror element can more closely match the image from the closer mirror. In some vehicles, it has been determined that the passenger's side mirror was located 30 percent up to 100 percent further from the driver's eyes. When the passenger's side mirror was at least 30 percent further from the driver's eye compared with the driver's side mirror, it is found that using a mirror with radius of curvature of at least 20 percent larger on the passenger's side is preferred, at least 30 percent larger on the passenger's side is more preferred, and at least 40 percent larger is most preferred.

In one embodiment spotter mirrors are used on the outside of both sides of a vehicle. The driver's side mirror is approximately 1 meter from the driver's eyes, while the mirror on the passenger's side of the vehicle is approximately 1.6 meter from the driver's eyes. The radius of curvature for the spotter mirror element is approximately 225 mm on the driver's side and approximately 425 mm on the passenger's side of the vehicle. When viewing similar sized objects located in the blind spot of the vehicle approximately 3 meters from each mirror, the object viewed in the passenger's side mirror will appear slightly larger than it did in the driver's side mirror. In this embodiment the main portion of the driver's side mirror is a flat mirror and the main portion of the passenger's side mirror is a convex mirror.

In another aspect of the invention, spotter mirrors can be used on the outside of both sides of a vehicle. The driver's side mirror is approximately 1 meter from the driver's eyes, while the mirror on the passenger's side of the vehicle is approximately 1.6 meters from the driver's eyes. The radius of curvature for the spotter mirror element is approximately 225 mm on the driver's side and approximately 225 mm on the passenger's side of the vehicle. When viewing similar sized objects located in the blind spot of the vehicle approximately 3 meters from each mirror, the object viewed in the passenger's side mirror appeared significantly smaller than it did in the driver's side mirror. In this embodiment, the main portion of the driver's side mirror is a flat mirror and the main portion of the passenger's side mirror is a convex mirror.

In still another aspect of the invention, a planar driver's side mirror can be combined with a spotter mirror element in an upper outboard corner. The spotter mirror element will have a radius of approximately 425 mm and is approximately 60 mm wide and 30 mm tall. The spotter mirror element can be positioned such that the image viewed at the inboard edge of the spotter mirror element is similar to and aligned with the image viewed in the outboard edge of the planar driver's side mirror. In this case, there would be no overlap between the spotter mirror element field of view and the standard mirror field of view. Additionally, another variation would be a planar driver's side mirror that is combined with a spotter mirror element in the upper outboard mirror corner. The spotter mirror element has a radius of approximately 225 mm and is approximately 80 mm wide and 40 mm tall. The spotter mirror element is positioned such that the image viewed at the inboard edge of the spotter mirror element is similar to and aligned with the image viewed in the inboard edge of the planar driver's side mirror. In this case, the field of view of the spotter mirror element included the entire field of view of the standard mirror. The spotter mirror element field of view can also included area outboard of the field of view of the standard mirror.

Figure 3:
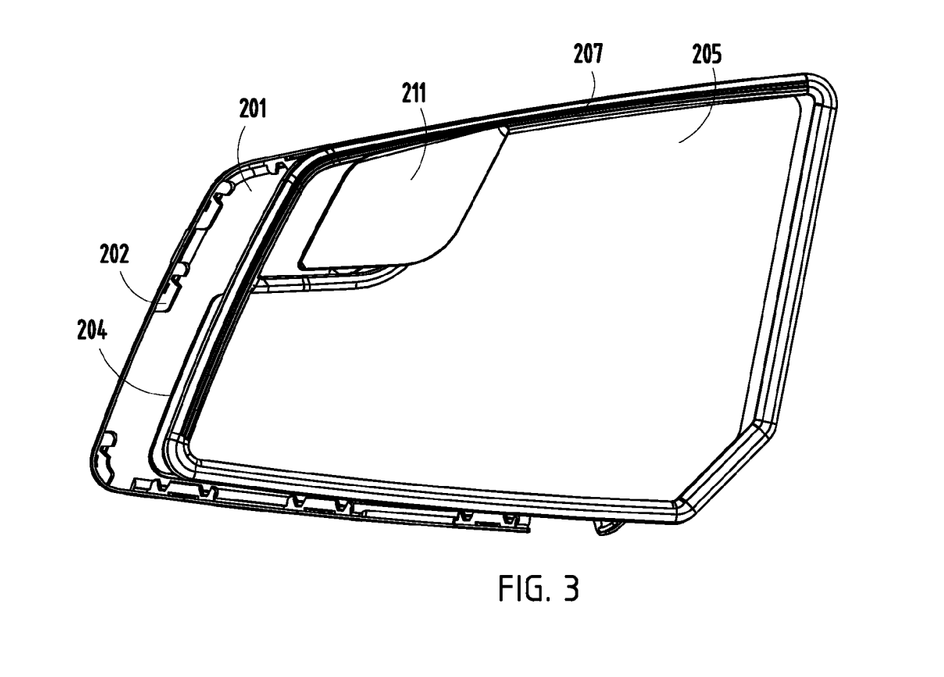
FIG. 3 is a front view of the mirror shown in FIG. 2.

FIG. 3 is a front exploded view of the heated blind spot mirror assembly as shown in FIG. 2. The glass carrier 201 is shown positioned behind the primary bezel 207 such that the spotter glass 211 is loaded into the spotter bezel 209 in front of the primary glass 205. One or more clip-like fastener 202 is used to engage a rear surface of the primary bezel 207 allowing the entire assembly to be snap-fit into a rigid position. The primary method used in heating the blind spot mirror assembly is through resistive element heating. The resistive heating can be accomplished using a constant wattage or positive thermal coefficient heater or by making direct contact to a conductive coating on the surface of the glass. One example of this technique would be to use a conductive reflective coating on the concave or convex surface of the spotter mirror element. In this type of application, the metal can be any metal or combination of metals. Contacts made to multiple locations on the conductive coating will provide a path for current flow resulting in heat generation. Ideally the contact positions and lengths would be arranged to provide uniform heating of the entire spotter mirror element.

In operation, the spotter glass 211 may typically be sized approximately 40 cm×50 cm (2000 cm$^2$) and is coated with a reflector comprising a metal or metal oxide. If the coating is a metal coating, it may comprise chromium, aluminum, or other reflective metal or metal alloy. In one example when using a coating as the resistive heater, a chrome coating is used with a sheet resistance of approximately 25 ohms/square. Contacts are made to the corners of the spotter mirror element which results in a resistance of approximately 45 ohms from contact to contact. Each contact is created with an approximately 5 cm bus-type clip or fastener (not shown) centered on the corner such that each edge has approximately 2.5 mm of contact to the conductive chrome coating. At a typical automotive potential of 12.8 volts, this resistive heater arrangement consumes approximately 3.6 watts of heat and can elevate the surface temperature of the spotter mirror element to greater than 100° C. under normal operating conditions. While in use, the corners of the spotter mirror element remain the coolest having the lowest temperature with this arrangement while the areas near the ends of the bus clips rise to the highest temperature. If less heat is desired, additional resistance can be added to the circuit to reduce the current flow. Resistance can be added in a number of ways, including, but not limited to, using a less conductive coating, adding resistance to the connecting lead, or increasing the contact resistance. If the connection to the spotter mirror element is made through traces on a standard heater, i.e., used on the remaining surface area of the mirror, the resistance can easily be modified by varying the resistance of the traces. In the above example, if an additional 25 ohms of resistance is added to the system, the heater power will drop to approximately 2.3 watts.

In order to improve heating uniformity, the position, the length, and the shape of the contacts can also be varied. If an ink or conductive adhesive is used to contact the conductive coating, the material may be dispensed in a pattern that will provide paths of conduction with nearly equal resistance across the mirror. This technique typically results in uniform heating. Further, conductive inks and adhesives can also be used to create a path of conduction on the mirror substrate. The conductive inks may be used on a substrate without a conductive coating or with a conductive or PTC coating. Those skilled in the art will recognize that this is one method to create automotive heaters. With typical automotive mirror heaters the conductive materials are typically applied to a plastic substrate which, in turn, is applied to the mirror substrate. Alternatively, conductive coatings on the mirror can be patterned in a similar fashion to create conductive paths for heating directly on the mirror substrate. The conductive coatings can be patterned using laser ablation, selective deposition, mechanical abrasion, or other known methods. Another common heating method is to use a combination of highly conductive materials and materials with a PTC material. The materials used to manufacture PTC heaters can also be applied directly to the mirror substrate to create a method to heat the glass.

Figure 4:
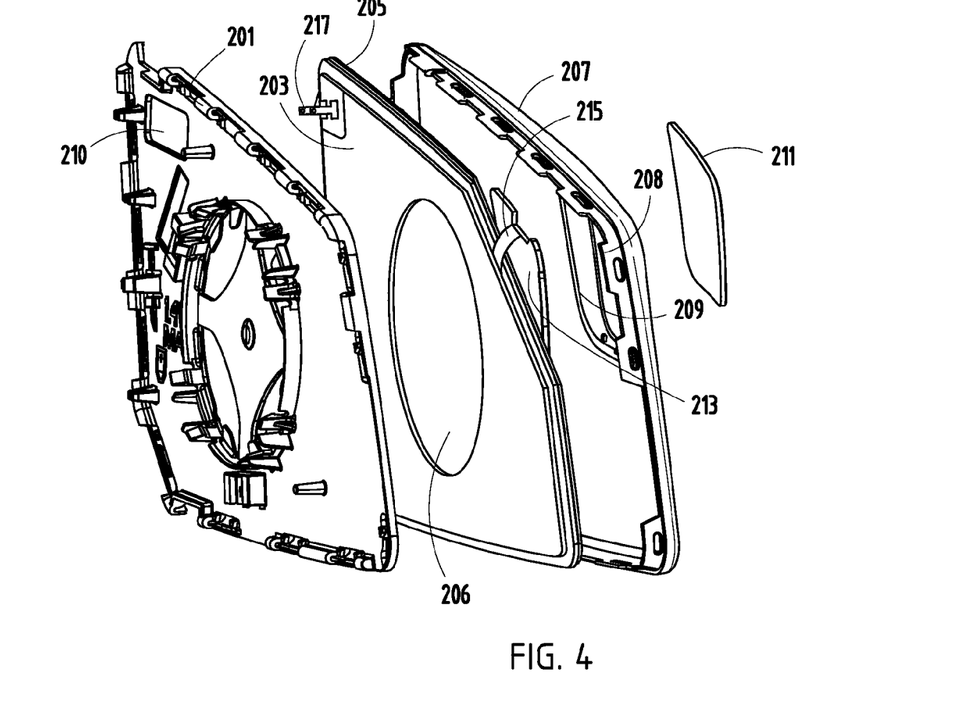
FIG. 4 is left side exploded view of the mirror shown in FIG. 2.

FIG. 4 is a rear exploded view of the mirror shown in FIG. 2. FIG. 4 illustrates the glass carrier 201 positioned behind the primary heater 203 such that the male connector 217 can connect and/or mates with a female connector (not shown) located externally to the glass carrier 201. The glass carrier 201 may include an aperture area 210 and retaining clip of use in connection with the female connector. The male connector 217 operates to supply a voltage to both the EC heater 203 and the spotter heating element 213 via a flexible or "flex" connection 215. The primary heater 203 may include a round aperture 206 that acts as a distortion relief hole for foam tape adhesive material. In order to provide heat to the spotter mirror glass 211, a spotter heating element 213 is used which connects to an electrical circuit (not shown) located within the primary heater 203 via the flex connection 215.

The spotter mirror heating element 213 is connected via a flex connection 215, which provides power to the heating element. The flex connector 215 allows the heating element 213 to be easily moved and/or adjusted such that it can be oriented within the spotter bezel 209. Finally, bezel 209 includes a slot 208 for allowing the heating element 213 to pass through spotter bezel 209 to provide heat between the spotter bezel 209 and spotter mirror glass 211. Once in position, the primary bezel 207 can be aligned with the glass carrier 201, primary heater 203, and the primary glass 205 in order to complete the assembly. As noted with regard to FIG. 2, the spotter glass 211 is loaded in the front of the spotter bezel 209 such that it makes contact with the spotter heating element 213. The spotter glass 211 may be held in position using one or more mechanical fasteners and/or adhesive materials for preventing it from disengaging from the spotter bezel 209.

Figure 5:
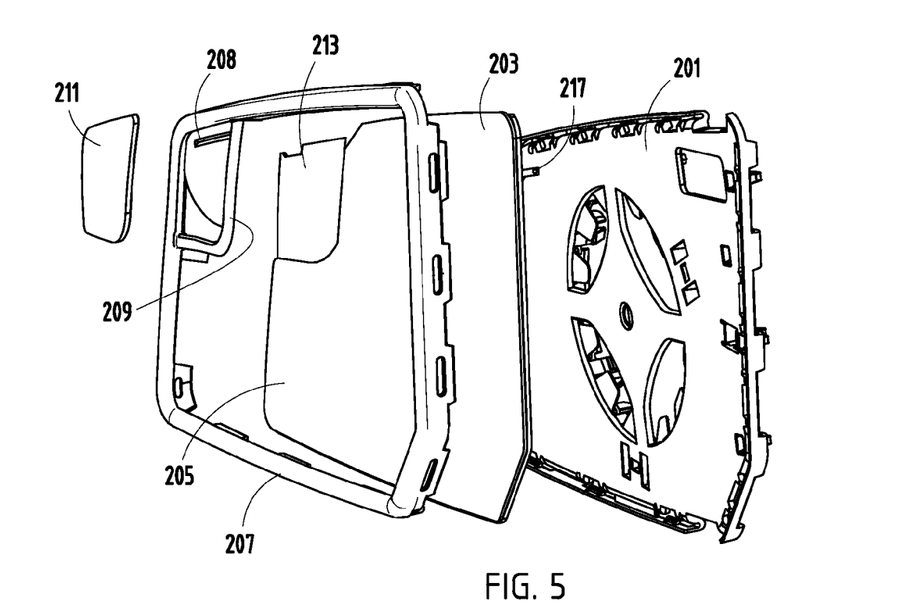
FIG. 5 is a right side exploded view of the mirror shown in FIG. 2.

FIG. 5 is a left side exploded view of the mirror shown in FIG. 2. In this view, the glass carrier 201 is shown in position behind the primary heater 203 such that the male connector 217 is oriented to mate with the female connector (not shown). The primary glass heater 213 is folded in a forward position over the top edge of the primary glass 205 such that it can make contact with a rear side of the spotter glass 211. As noted herein, the primary bezel 207 can then be mated with the glass carrier 201 in order to provide a fixed assembly for mounting outside a vehicle. As noted above, a slot 208 is located in the bezel 209 for allowing the heating element 213 to pass through spotter bezel 209. The spotter heating element 213 can contact or come in close proximity to the rear surface of the spotter glass 211 for providing heat between the spotter bezel 209 and spotter mirror glass 211.

Figure 6:
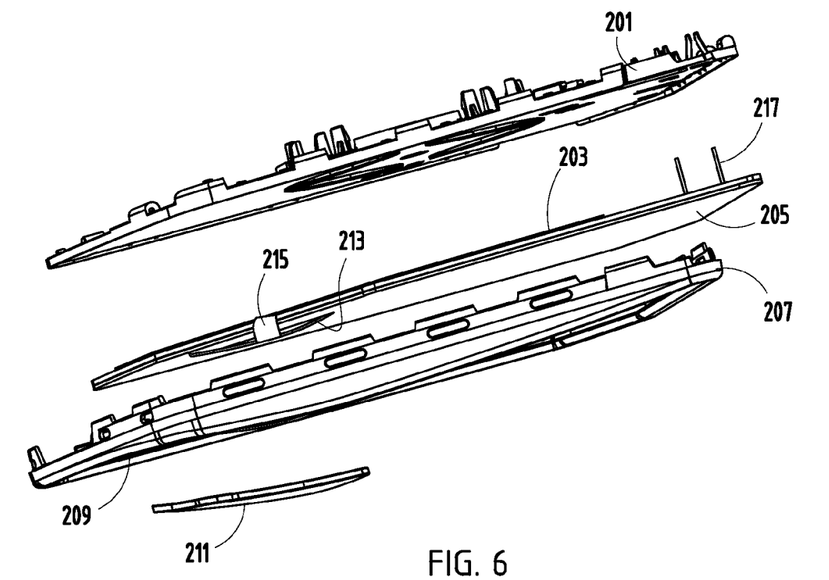
FIG. 6 is a top exploded view of the mirror shown in FIG. 2.

FIG. 6 is a top exploded view of the mirror shown in FIG. 2. In this view, the top portion of the glass carrier 201 is shown positioned behind the primary heater 203 and primary glass 205. The flex connector 215 extends above the primary glass 205 in order to make connection with the spotter heating element 213. The connector 217a extends from rear of the primary heater 203 in order to provide an electrical connection for the primary heater 203 and the spotter heating element 213. The spotter glass 211 is then positioned within the spotter bezel 209 allowing the primary bezel to be mated with the glass carrier 201 in order to provide a finished heated blind spot mirror assembly.

Figure 7:
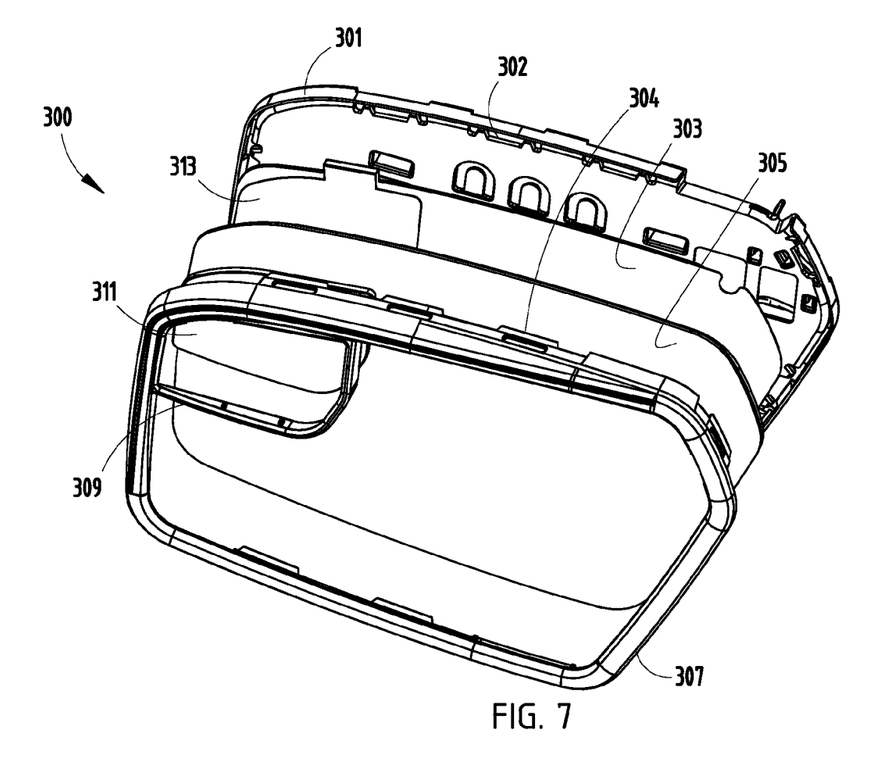
FIG. 7 is an isometric view of a second embodiment of a heated blind spot mirror assembly with a portion of the mirror assembled from the rear of the bezel.

FIG. 7 is an isomeric view of a heated blind spot mirror assembly 300 with a portion of the mirror assembly from the rear of the bezel in accordance with a second embodiment of the invention. The embodiment as shown in FIG. 7 may be referred to as a "back-loaded" heated blind spot mirror assembly as the mirror glass is inserted behind the bezels as described herein. The blind spot mirror assembly 300 includes a glass carrier 301 that forms the rear portion of the assembly and is used provide a rear housing for the primary heater 303 and primary glass 305. The primary heater 303, is a heating element as described herein, that is used to provide a heated surface to the rear of the primary or primary glass 305. Through the process of conduction and convection, heat is transferred to the primary glass material 305 enabling it to remove and/or melt moisture which has accumulated on the surface of the primary glass 305.

As is well-known in the art, the primary glass 305 acts as a reflective surface allowing the user to view objects behind the vehicle while also including the capability to vary its reflectivity in order to reduce glare and unwanted reflections. In order to allow the driver/operator to view objects in the vehicle's blind spot, a secondary mirror such as spotter glass 311 is positioned in front of the primary glass 305 such that it can be loaded into the spotter bezel 309. Although the preferred embodiment is described using standard, non-EC glass, it will be evident to those skilled in the art that EC glass may be used with both the primary glass 305 or the spotter glass element 311 or in combinations of standard glass and EC glass. In that the spotter glass 311 is loaded from the rear of the spotter bezel 309, this prevents the spotter glass 309 from easily being removed from its fixed position within the bezel. Additionally, this also allows the spotter bezel 309 to cover the rough appearance of the seamed edge of the spotter glass 311 making for a more clean, finished exterior appearance. As will be clear to those skilled in the art, this type of assembly requires fewer mechanical fasteners and/or adhesives to be used in connection with the spotter glass 311 in order to hold it firmly in position.

In order to keep the spotter glass 311 from being obstructed by chilled and/or frozen moisture, a spotter heating element 313 is located behind the spotter glass 311 to provide a predetermined amount of heat for this purpose. It will also be recognized that in the region of the spotter glass 311, heat from the primary glass 305 can also be transferred to the spotter glass 311 by a combination of conduction and convection. Thus, when each of the elements are in position, the heated blind spot mirror assembly 300 can be assembled such that the glass carrier 301 and its associated fasteners 302 are engaged with fasteners 304 located on the rear surface of the primary bezel 307. Both fasteners 302 and fasteners 304 join in order to mechanically hold the primary heater 303, primary glass 305, and spotter glass 311 in compression in order to form a finished mirror assembly 300.

Figure 8:
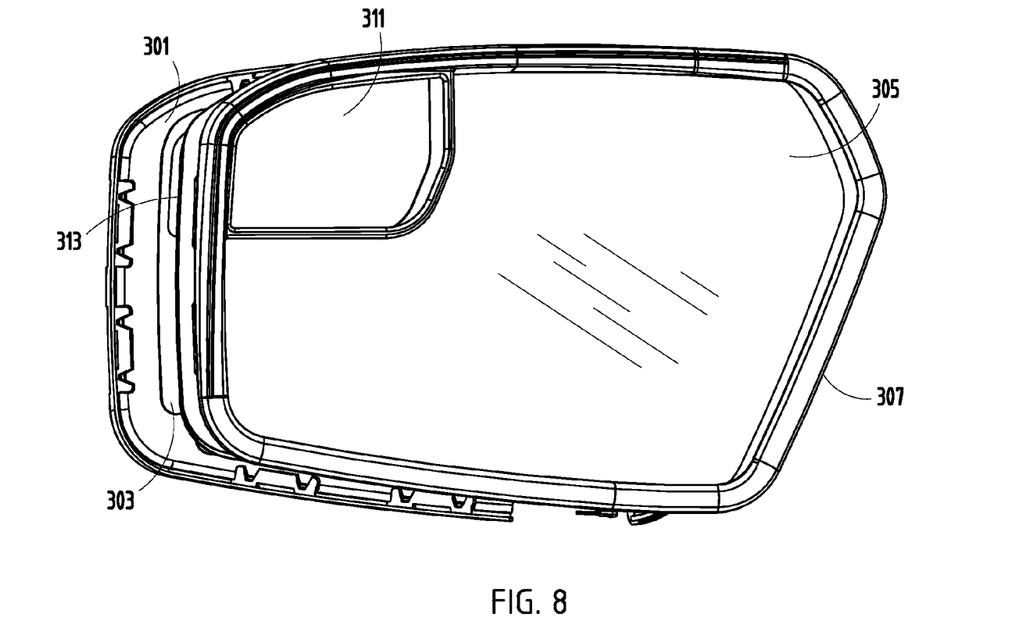
FIG. 8 is a front view of the mirror shown in FIG. 7.

FIG. 8 is a front view of the mirror shown in FIG. 7. This view illustrates the glass carrier 301 positioned directly behind the primary element 303. The primary glass 305 and spotter glass 311 work in combination to allow the driver to not only view objects behind the vehicle, but also to view those in the vehicle's blind spot.

Figure 9:
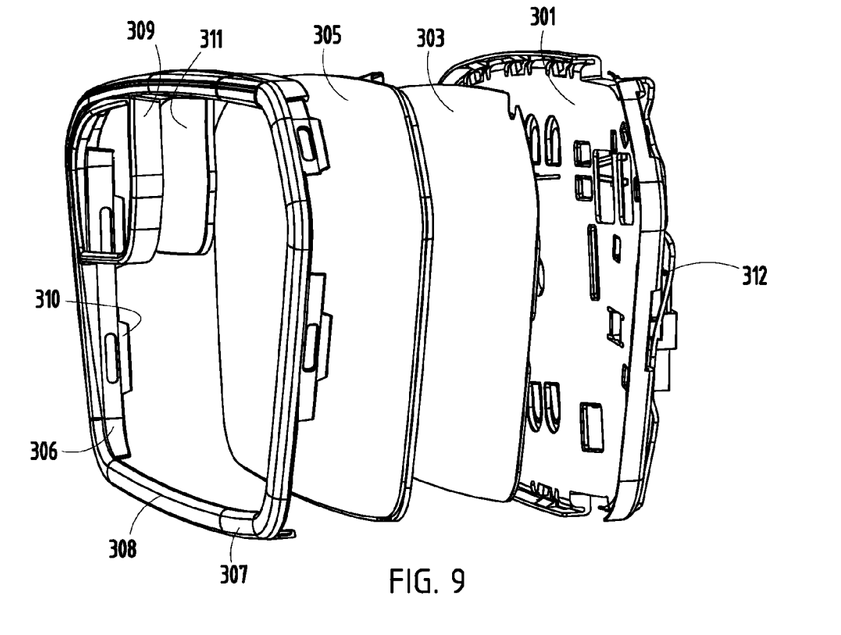
FIG. 9 is a right side exploded view of the mirror shown in FIG. 7.

FIG. 9 is a right side exploded view of the mirror shown in FIG. 7. In this view, the glass carrier 301 is shown positioned behind the primary heater 303. The primary glass 305 is oriented in front of the primary heater 313, where the spotter glass 311 may be loaded into the spotter bezel 309 from the back of the bezel. The primary bezel 307 includes a channel 306 for journaling the primary glass 305 and primary heater 303 in a manner such that they cannot be moved as they are held firmly against the front portion 308 of the bezel. A plurality of rearwardly facing clips 310 are joined with corresponding apertures 312 which are present in the glass carrier 301. When assembled, this allows the heated blind spot mirror assembly 300 to be held in compression in a tightly-formed package so that it may be mounted to the exterior of the vehicle.

Figure 10:
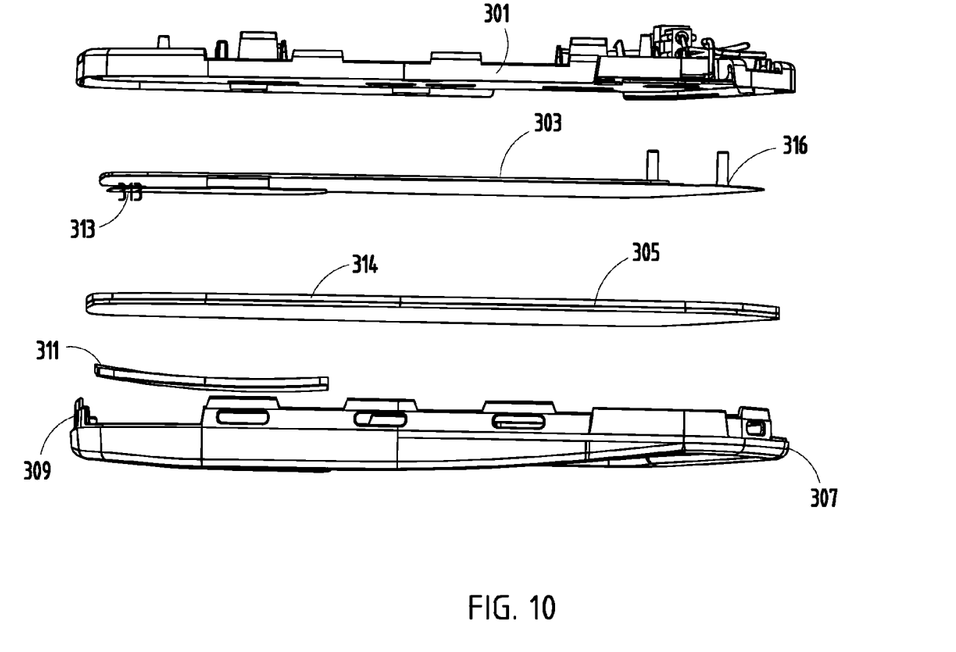
FIG. 10 is a top side exploded view of the mirror shown in FIG. 7.

FIG. 10 is a top side exploded view of the mirror shown in FIG. 7. FIG. 10 illustrates the glass carrier 301, primary heater 303, primary glass 305, and the primary bezel 307 oriented in a manner such that the primary glass 307 may be loaded into the spotter bezel 309. FIG. 9 also shows the primary heater 313 includes a male connector 316 located on the rear of the heating element for connection with a female electrical connector (not shown). The female connector is used for providing an electrical voltage to the primary glass element as well as the spotter heating element 313. As noted herein, the primary heating element 313 may include a flex-like connector for extending the primary heating element over the top edge 314 of the primary glass 305. This enables the primary heating element 313 to be positioned directly behind the spotter glass 311 in order to melt and/or remove ice, moisture, or other types of condensation which would prevent the user from viewing objects in the vehicle's blind spot. In operation, the heated blind spot mirror assembly 300 is assembled such that it is held in a compressed condition allowing the mirror to be mounted to the exterior portion of the vehicle.

Figure 11:
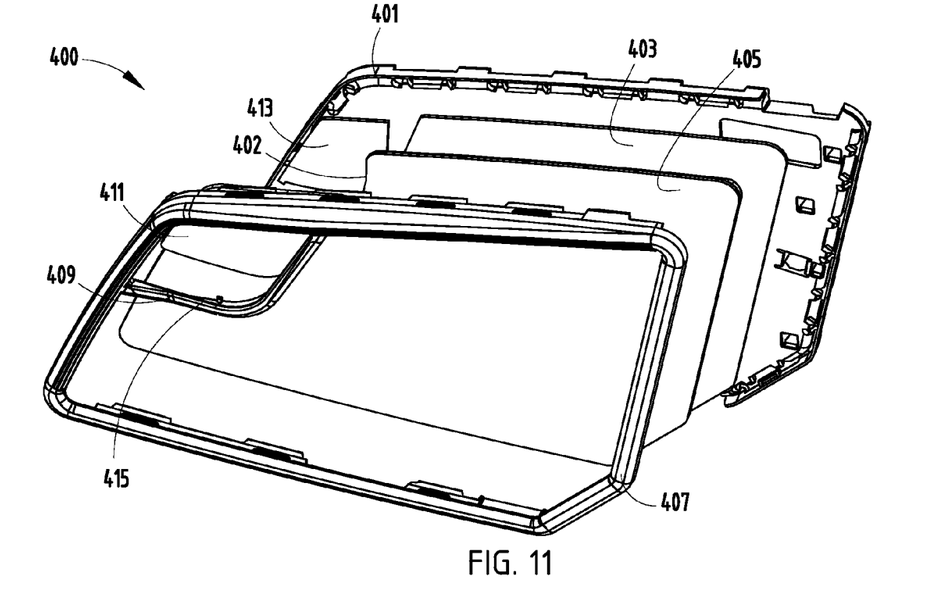
FIG. 11 is an isometric view of a third embodiment of a heated blind spot mirror assembly having a notched section in the primary glass element.

FIG. 11 is an isomeric view of a heated blind spot mirror assembly 400 that includes a notched section of the primary or primary glass in accordance with a third embodiment of the invention. The embodiment as shown in FIG. 11 is also a "back-loaded" heated blind spot mirror assembly, like that shown in FIG. 7, since the mirror glass and spotter glass elements are inserted behind their respective bezels. As in the other embodiments, the blind spot mirror assembly 400 includes a glass carrier 401 that forms the rear portion of the assembly and is used provide a rear housing for the primary heater 403 and a primary mirror such as primary glass 405. The primary heater 403 is a heating element that is used to provide a heated surface to the rear of the primary glass 405 and works to remove ice and/or other moisture that can obstruct the driver's view in the primary glass 405. As noted herein, the conduction and convection processes work to transfer heat to the primary glass material 405. As noted previously, the primary glass 405 acts as a reflective surface allowing the user to view objects behind the vehicle while also including the capability to vary its reflectivity in order to reduce glare and unwanted reflections. In order to allow the driver/operator to view objects in the vehicle's blind spot, a secondary mirror, such as spotter glass 411, is positioned within a notch portion 402 located in the primary glass 405. The spotter glass 411 can be fastened with the spotter bezel 409 using one of more mechanical type fasteners 415.

Figure 12:
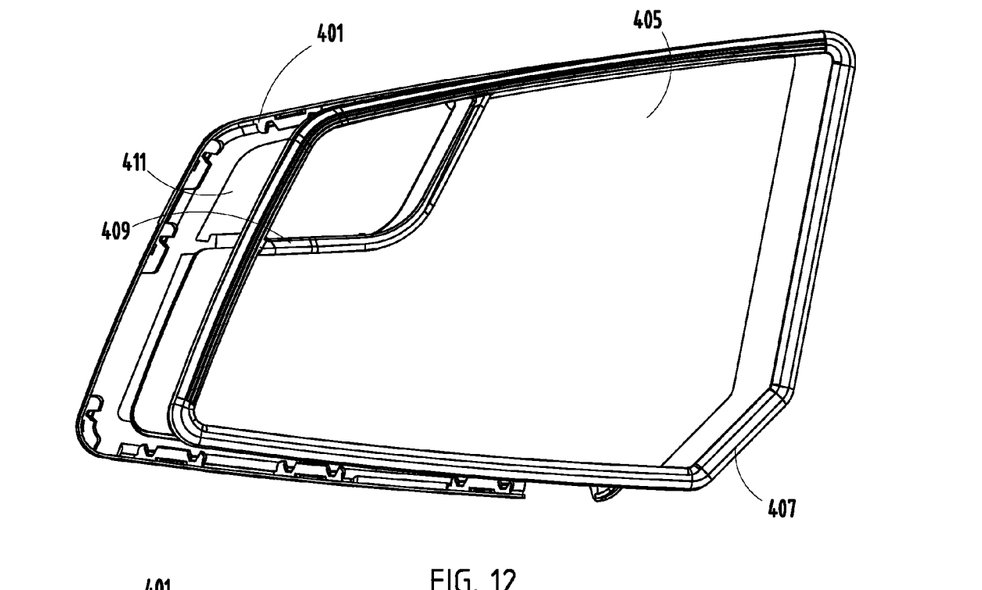
FIG. 12 is a front view of the mirror shown in FIG. 11.
Figure 13:
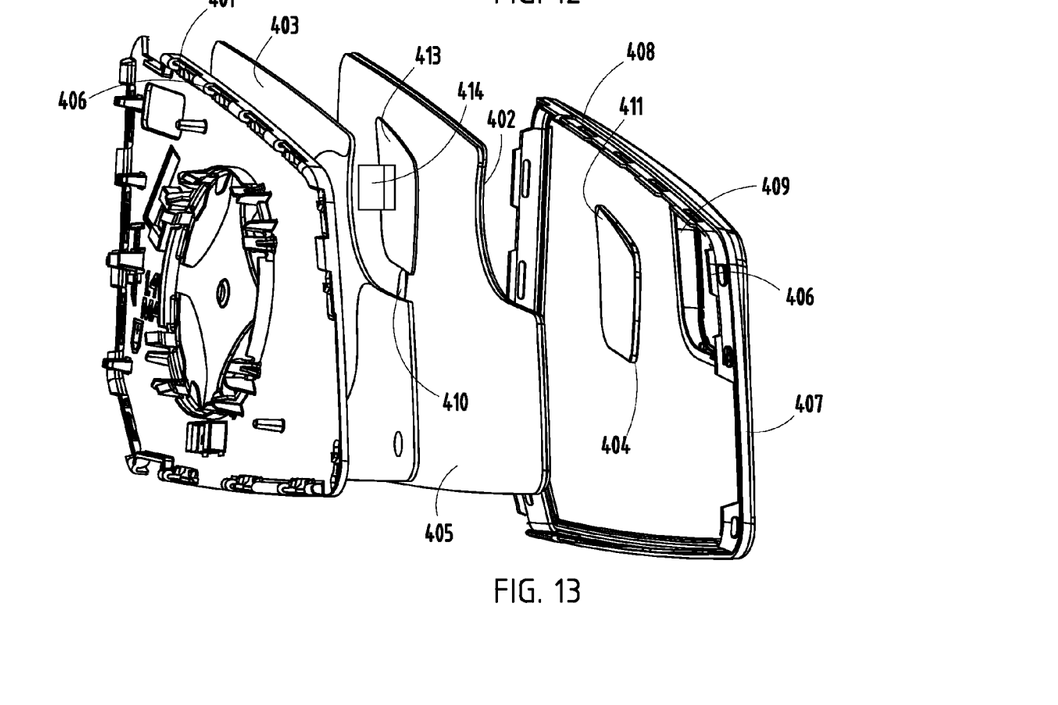
FIG. 13 is a left side exploded view of the mirror shown in FIG. 11.
Figure 14:
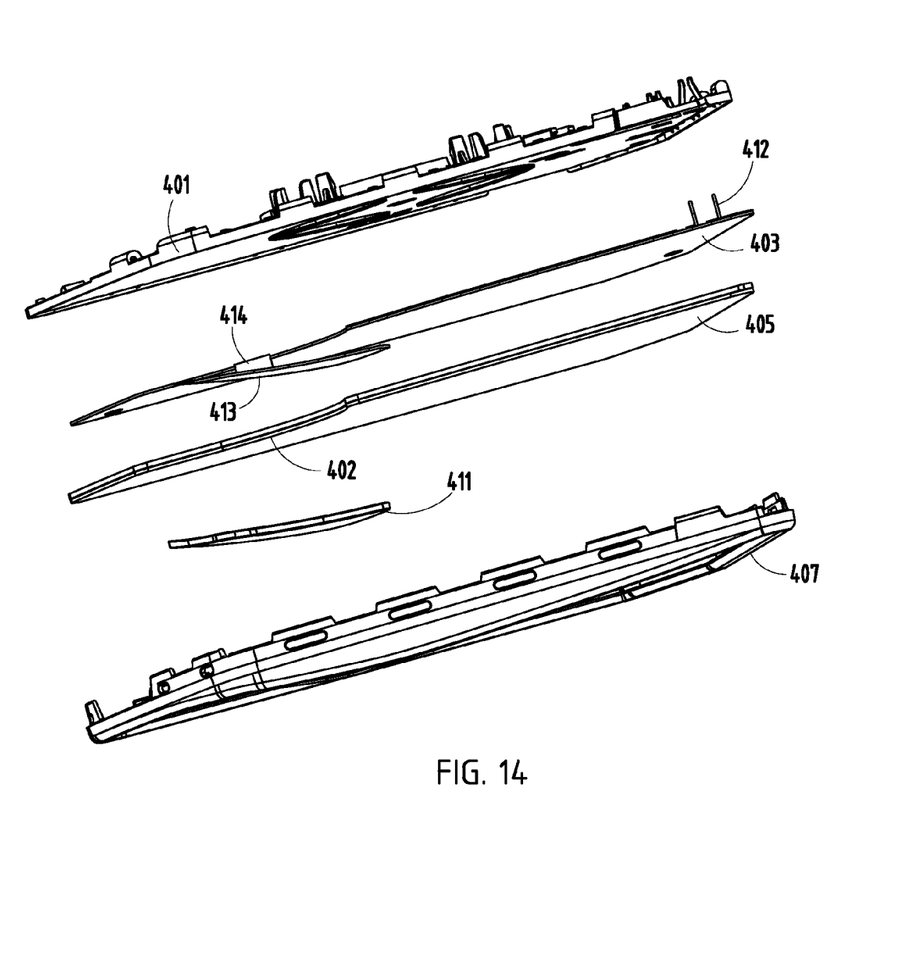
FIG. 14 is a top exploded view of the mirror shown in FIG. 11.

Similarly, FIG. 12 is a front view, FIG. 13 is a left side exploded view, while FIG. 14 is a top exploded view all of the heated blind spot mirror assembly 300 shown in FIG. 11. As best seen in FIG. 13, the notch portion 402 is shaped and sized appropriately in order to allow the spotter glass 411 to remain planar to or recessed behind the primary glass 405. In the assembly process, the notched portion 402 allows the outboard end 404 of the spotter glass 411 to be tipped in a downward manner, away from the driver, and into the primary glass 405 without making the finished assembly extend beyond some predetermined thickness. This angled or tipped spotter glass 411 provides a greater field of view than if the spotter glass 411 were to lie entirely atop the front surface the primary glass 405. Moreover, the notch portion 402 also creates an opening that provides direct access to an primary heater 403. Therefore, a spotter heating element 413 need not fold a full 180 degrees around to the front portion of the primary glass 405 in order to make contact with the spotter glass 311. This can also provide a more efficient means for providing the transfer of heat form the spotter heating element 413 and the spotter glass 411.

In order to keep the spotter glass 411 from being obstructed by chilled and/or frozen moisture, the spotter heating element 413 is located behind the spotter glass 411 to provide a predetermined amount of heat. The primary heater 403 and the spotter heating element 413 can be powered by a flex connector 410; however, the flex circuit or connector need not fold 180 degrees around to the front of the primary element like that shown in FIGS. 2 and 7. A male connector 412 is used to provide power to the flex circuit.

However, similar to the other embodiments, when each of the elements are in position, the heated blind spot mirror assembly 400 can be assembled such that the glass carrier 401 and its associated fasteners 406 are engaged with fasteners 408 located on the rear surface of the primary bezel 407. A spacer 414 made of foam or other materials is used to provide enhanced compression for the blind spot mirror assembly 400 so that the assembly remains tight without buzz, squeak, rattle, or other extraneous noise from the spotter glass 411 while against the spotter bezel 409. As compared with a front loaded mirror, the blind spot mirror assembly 400 requires fewer mechanical fasteners and/or adhesives to be used in connection with the spotter glass 411 in order to fasten it into position. Both fasteners 406 and fasteners 408 join in order to mechanically hold the primary heater 403, primary glass 405, and spotter glass 411 in compression in order to form a finished mirror assembly 400.

Thus, embodiments of the present teach the use of a front and back loaded vehicular mirror that includes a glass carrier and a primary bezel forming a housing. A primary glass mirror and primary glass heater are positioned behind the primary glass mirror, while a spotter mirror element and spotter heater are used to provide the driver with a view for the vehicle's blind spot. A spotter mirror bezel is formed within the primary bezel for holding the spotter mirror element. The primary glass mirror may also included a notched section for orienting the at least one spotter mirror element in a manner to provide a greater field of view. The vehicular mirror as described herein may be used in motor vehicle mirror system where a first spotter mirror element on a driver side of the vehicle has a first radius of curvature and a second spotter mirror element on a passenger side of the vehicle having a second radius of curvature that is less than the first radius of curvature.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A vehicular mirror assembly comprising:
    a first bezel for housing a primary glass element;
    a primary glass heating element for heating the primary glass element;
    a second bezel for housing a spotter glass element;
    a spotter glass heating element having a flexible connector where the spotter glass heating element is positioned behind the spotter glass element for heating the spotter glass above an ambient temperature; and
    wherein the flexible connector extends over an edge of the primary glass heating element and supplies power to the spotter glass heating element through the flexible connector from at least one circuit trace extending from the primary glass heating element.

2. A vehicular mirror assembly as in claim 1, wherein the second bezel is integrally formed as a part of the first bezel.

3. A vehicular mirror assembly as in claim 1, wherein the primary glass element is electrochromic (EC) glass.

4. A vehicular mirror assembly as in claim 1, wherein the spotter glass element is electrochromic (EC) glass.

5. A vehicular mirror assembly as in claim 1, wherein the top surface of the primary glass element is positioned below the top surface of the spotter glass element.

6. A vehicular mirror assembly as in claim 1, wherein the spotter glass heating element directly heats the spotter glass element using a resistive coating.

7. A vehicular mirror assembly as in claim 1, wherein the spotter glass is loaded into the second bezel from the front of the second bezel.

8. A vehicular mirror assembly as in claim 1, wherein the spotter glass is loaded into the second bezel from the rear of the second bezel.

9. A vehicular mirror assembly as in claim 1, further comprising:
    a primary heater positioned behind the primary glass element.

10. A vehicular mirror assembly as in claim 1, further comprising:
    a glass carrier positioned behind the primary heater for forming a rear portion of the vehicular mirror assembly.

11. A vehicular mirror assembly as in claim 1, wherein the flexible connector enables the spotter heating element to move behind the spotter glass element.

12. A vehicular mirror assembly as in claim 11, wherein a primary heater and the spotter glass heating element are powered through the flexible connection.

13. A vehicular mirror assembly as in claim 1, further comprising:
    at least one clip attached to the spotter bezel for holding the spotter glass element into a fixed position.

14. A vehicular mirror assembly as in claim 1, wherein the primary glass element includes a notched section for orienting the spotter glass element to provide a greater field of view.

15. A vehicular mirror assembly as in claim 1, wherein a mirror assembly is positioned on both the driver side and passenger side of a vehicle such that the passenger side of the vehicle has a flatter surface than that on the driver's side of the vehicle.

16. A vehicular mirror assembly as in claim 15, wherein the passenger side mirror has a radius of curvature of at least approximately 20 percent less than the driver side mirror.

17. An outside vehicular mirror assembly comprising:
    a primary glass element;
    a primary glass heater covering a portion of the rear surface of the primary glass element;
    a spotter glass element positioned adjacent to the primary glass element;
    a spotter glass heater having a flexible connector where the spotter glass heater is positioned behind the spotter glass element; and
    wherein the flexible connector extends over an edge of the primary glass heater and is connected to at least one circuit trace for supplying power to the spotter glass heater.

18. An outside vehicular mirror assembly as in claim 17, further comprising:
    a spotter glass bezel substantially surrounding the spotter glass element.

19. A outside vehicular mirror assembly as in claim 17, wherein the primary glass element is electrochromic (EC) glass.

20. A outside vehicular mirror assembly as in claim 17, wherein the spotter glass element is electrochromic (EC) glass.

21. An outside vehicular mirror assembly as in claim 18, wherein the spotter glass bezel is integrally formed within a primary bezel surrounding both the primary glass element and spotter glass element.

22. An outside vehicular mirror assembly as in claim 18, the top surface of the primary glass element is positioned below the top surface of the spotter glass element.

23. An outside vehicular mirror assembly as in claim 18, wherein the spotter glass is loaded into the bezel from the front of the bezel.

24. An outside vehicular mirror assembly as in claim 23, wherein the spotter glass is fixed into position in the spotter bezel using an adhesive material.

25. An outside vehicular mirror assembly as in claim 18, wherein the spotter glass is loaded into the bezel from the rear of the bezel.

26. An outside vehicular mirror assembly as in claim 25, wherein the spotter glass is fixed into position between the spotter bezel and the spotter glass heater.

27. A vehicular mirror assembly as in claim 18, further comprising:
    at least one clip attached to the spotter bezel for holding the spotter mirror element into a fixed position.

28. An outside vehicular mirror assembly as in claim 17, further comprising a glass carrier for forming a rear housing for the outside vehicular mirror assembly.

29. An outside vehicular mirror assembly as in claim 17, wherein the flexible connector enables the spotter glass heater to extend over an edge of the primary glass element.

30. An outside vehicular mirror assembly as in claim 29, wherein a primary glass heater and the spotter glass heating element are powered using the flexible connector.

31. An outside vehicular mirror assembly as in claim 17, wherein the primary glass element includes a notched section for orienting the spotter glass element to provide a greater field of view.

32. A outside vehicular mirror assembly as in claim 17, wherein a mirror assembly is positioned on both the driver side and passenger side of a vehicle such that the passenger side of the vehicle has a flatter surface than that on the driver's side of the vehicle.

33. A outside vehicular mirror assembly as in claim 30, wherein the passenger side mirror has a radius of curvature of at least approximately 20 percent less than the driver side mirror.

34. A spotter mirror assembly for use in vehicular applications comprising:
    a glass carrier and a primary bezel forming a housing;
    a primary glass mirror using electrochromic (EC) glass;
    a primary glass heater positioned behind the primary glass mirror;
    at least one spotter mirror element using non-EC glass;
    a spotter mirror heater having a flexible connector where the spotter mirror heater is positioned behind the at least one spotter mirror element;
    a spotter mirror bezel positioned within the primary bezel for holding the spotter mirror element into a fixed position; and
    wherein the flexible connector extends over an edge of the primary glass heater and at least one circuit trace is connected to a flexible connector for supplying power to the spotter glass heater.

35. A spotter mirror assembly as in claim 34, wherein the spotter mirror bezel is integrally formed with the primary bezel.

36. A spotter mirror assembly as in claim 34, wherein the primary glass mirror is electrochromic (EC) glass.

37. A spotter mirror assembly as in claim 34, wherein the at least one spotter mirror element is electrochromic (EC) glass.

38. A spotter mirror assembly as in claim 34, wherein the spotter mirror heater directly heats the at least one spotter mirror element using a resistive coating.

39. A spotter mirror assembly as in claim 34, wherein the at least one spotter mirror element is loaded into the spotter bezel from the front of the spotter bezel.

40. A spotter mirror assembly as in claim 39, wherein the at least one spotter mirror element is held into the spotter bezel using an adhesive material.

41. A spotter mirror assembly as in claim 34, wherein the at least one spotter mirror element is loaded into the spotter bezel from the rear of the spotter bezel.

42. A spotter mirror assembly as in claim 34, wherein the spotter mirror element is held into the spotter bezel by the primary glass mirror.

43. A spotter mirror assembly as in claim 34, wherein the flexible connector extends over an edge of the primary glass mirror.

44. A spotter mirror assembly as in claim 43, wherein the flexible connector is used to provide power to both the primary glass heater and the spotter mirror heater.

45. A spotter mirror assembly as in claim 34, further comprising at least one fastener in the spotter mirror bezel for fastening to the spotter mirror element into a fixed position.

46. A spotter mirror assembly as in claim 34, wherein the front surface of the spotter mirror element is recessed within the spotter bezel and is positioned below the front surface of the primary glass mirror.

47. A spotter mirror assembly as in claim 34, wherein the primary glass mirror includes a notched section for orienting the at least one spotter mirror element to provide a greater field of view.

48. A spotter mirror assembly as in claim 34, wherein a spotter mirror element is positioned on both the driver side and passenger side of a vehicle such that the passenger side of the vehicle has a flatter surface than that on the driver's side of the vehicle.

49. A spotter mirror assembly as in claim 48, wherein the passenger side mirror has a radius of curvature of at least approximately 20 percent lesser than the driver side mirror.

50. A vehicular mirror comprising:
    a glass carrier and a primary bezel forming a housing;
    a primary glass mirror;
    a primary glass heater positioned behind the primary glass mirror;
    at least one spotter mirror element;
    a spotter mirror heater including a flexible connector where the spotter mirror heater is positioned behind the at least one spotter mirror element;
    a spotter mirror bezel formed within the primary bezel for holding the spotter mirror element; and
    wherein the flexible connector extends over an edge of the primary glass heater and power to the at least one spotter mirror heater is supplied from the primary glass heater through the flexible connector from at least one circuit trace.

51. A vehicular mirror as in claim 50, wherein the spotter mirror heater includes a resistive coating for providing a heated surface.

52. A vehicular mirror as in claim 50, wherein the spotter mirror element is loaded into the spotter bezel from the front of the spotter bezel.

53. A vehicular mirror as in claim 50, wherein the spotter mirror element is held into the spotter bezel using an adhesive material.

54. A vehicular mirror as in claim 50, wherein the at least one spotter mirror element is loaded into the spotter bezel from the rear of the spotter bezel.

55. A vehicular mirror as in claim 50, wherein the primary mirror is an electrochromic (EC) glass mirror.

56. A vehicular mirror as in claim 50, wherein the at least one spotter mirror element is electrochromic (EC) glass.

57. A vehicular mirror as in claim 50, further comprising at least one fastener positioned in the spotter mirror bezel for fastening to the spotter mirror element into a fixed position.

58. A vehicular mirror as in claim 50, wherein the front surface of the spotter mirror element is recessed within the spotter bezel and is positioned below the front surface of the primary glass mirror.

59. A vehicular mirror as in claim 50, wherein the primary glass heater and the spotter mirror heater are powered though a common flexible connection.

60. A vehicular mirror as in claim 50, wherein a vehicular mirror is positioned on both the driver side and passenger side of a vehicle such that the passenger side of the vehicle has a flatter surface than that on the driver's side of the vehicle.

61. A vehicular mirror as in claim 60, wherein the passenger side mirror has a radius of curvature of at least approximately 20 percent lesser than the driver side mirror.

62. A motor vehicle mirror system comprising:
   a first spotter mirror element on a driver side of the vehicle having a first radius of curvature where the first spotter mirror is comprised of:
      a first bezel for housing a primary glass element;
      a second bezel for housing a spotter glass element;
      a spotter glass heating element having a flexible connector where the spotter glass heating element is positioned behind the spotter glass element for heating the spotter glass above an ambient temperature;
      at least one circuit trace connected to a flexible connector for supplying power to a primary glass heating element and the spotter glass heating element;
   a second spotter mirror element on a passenger side of the vehicle having a second radius of curvature that is less than the first radius of curvature; and
   wherein the flexible connector extends over an edge of the primary glass heating element.

63. A motor vehicle mirror system as in claim 62, wherein the second radius of curvature is at least 20 percent less than the first radius of curvature.

64. A motor vehicle mirror system as in claim 62, wherein the second radius of curvature is at least 30 percent less than the first radius of curvature.

65. A motor vehicle mirror system as in claim 62, wherein the second radius of curvature is at least 40 percent less than the first radius of curvature.

66. A motor vehicular mirror system as in claim 62, wherein the primary glass element is electrochromic (EC) glass.

67. A motor vehicle mirror system as in claim 62, wherein the spotter glass element is electrochromic (EC) glass.

68. A vehicular mirror assembly as in claim 1, wherein the flexible connector enables the spotter glass heating element to extend over an edge of the primary glass element.

69. A vehicular mirror assembly as in claim 1, wherein the primary glass heating element and the spotter glass heating element are powered using the flexible connector.

70. A motor vehicle mirror system as in claim 60, wherein the flexible connector enables the spotter glass heating element to extend over an edge of the primary glass element.

71. A motor vehicle mirror system as in claim 60, wherein the primary glass heating element and the spotter glass heating element are powered using the flexible connector.

* * * * *

UNITED STATES PATENT AND TRADEMARK OFFICE
CERTIFICATE OF CORRECTION

| | |
|---|---|
| PATENT NO. | : 8,503,060 B2 |
| APPLICATION NO. | : 12/192395 |
| DATED | : August 6, 2013 |
| INVENTOR(S) | : Thomas et al. |

It is certified that error appears in the above-identified patent and that said Letters Patent is hereby corrected as shown below:

In the Specification

Col. 1, line 43;
    "becomes" should be -- become --;

Col. 1, line 50;
    "effects" should be -- affects --;

Col. 2, line 8;
    "stick-on" should be -- stick on --;

Col. 2, line 14;
    "other" should be -- another --;

Col. 2, line 32;
    "6,359,274 5,151,824" should be -- 6,359,274, 5,151,824 --;

Col. 3, line 31;
    "proceeded" should be -- preceded --;

Col. 3, line 61;
    "are" should be -- is --;

Col. 4, line 46;
    "maybe" should be -- may be --;

Col. 5, line 6;
    Insert -- that -- after -- art --;

Col. 5, line 61;
    "eye" should be -- eyes --;

Col. 6, line 48;
    "included" should be -- include an --;

Signed and Sealed this
Twentieth Day of January, 2015

Michelle K. Lee
*Deputy Director of the United States Patent and Trademark Office*

Col. 8, line 52;
   "isomeric" should be -- isometric --;

Col. 8, line 45;
   Insert -- the -- after -- from --;

Col. 9, line 11;
   "well-known" should be -- well known --;

Col. 10, line 13;
   "isomeric" should be -- isometric --;

Col. 10, line 23;
   Insert -- to -- after -- used --;

Col. 10, line 39;
   "of" should be -- or --;

Col. 10, line 41;
   Insert -- , -- after -- view --;

Col. 10, line 52;
   Insert -- of -- after -- surface --;

Col. 10, line 54;
   "an" should be -- a --;

Col. 10, line 59;
   "form" should be -- from --;

Col. 11, line 20;
   Insert -- invention -- after -- present --;

Col. 11, line 28;
   "included" should be -- include --;

Col. 11, line 31;
   "system" should be -- systems --;

Col. 11, line 32;
   "driver" should be -- drivers --;

Col. 11, line 34;
   "passenger" should be -- passengers --;

Col. 11, line 44;
   Insert -- the -- after -- for --;

Col. 11, line 48;
   Delete "a";

CERTIFICATE OF CORRECTION (continued)
U.S. Pat. No. 8,503,060 B2

In the Claims

Col. 12, line 30, Claim 12;

"claim 11" should be -- claim 1 --;

Col. 12, line 65, Claim 19;

"A" should be -- An --;

Col. 13, line 1, Claim 20;

"A" should be -- An --;

Col. 13, line 42, Claim 32;

"A" should be -- An --;

Col. 13, line 47, Claim 33;

"A" should be -- An --;

Col. 14, line 27, Claim 44;

"claim 43" should be -- claim 34 --;

Col. 14, line 48, Claim 49;

"lesser" should be -- less --;

Col. 15, line 30, Claim 61;

"lesser" should be -- less --;

Col. 16, line 20, Claim 66;

"vehicular" should be -- vehicle --.